(12) United States Patent
Rudd

(10) Patent No.: US 9,260,061 B1
(45) Date of Patent: Feb. 16, 2016

(54) EQUIPMENT AND ACCESSORIES HOLDER

(71) Applicant: Daniel Rudd, Dallas, TX (US)

(72) Inventor: Daniel Rudd, Dallas, TX (US)

(*) Notice: Subject to any disclaimer, the term of this patent is extended or adjusted under 35 U.S.C. 154(b) by 0 days.

(21) Appl. No.: 14/580,258

(22) Filed: Dec. 23, 2014

(51) Int. Cl.
*B60R 9/06* (2006.01)

(52) U.S. Cl.
CPC ...................... *B60R 9/065* (2013.01)

(58) Field of Classification Search
CPC ............ B60R 9/065; B60R 9/06; B60R 9/00; Y10S 280/05; A63B 55/00; A63B 55/60
USPC ......................................................... 224/274
See application file for complete search history.

(56) References Cited

U.S. PATENT DOCUMENTS

| | | | | |
|---|---|---|---|---|
| 4,045,103 A | * | 8/1977 | Paolino | A47B 81/00 211/85.18 |
| 5,213,364 A | * | 5/1993 | Theckston | 280/769 |
| 5,788,070 A | * | 8/1998 | Banker | A63B 55/00 206/315.2 |
| D432,363 S | * | 10/2000 | Bassford et al. | D7/605 |
| D463,999 S | * | 10/2002 | Beck et al. | D12/16 |
| 6,457,317 B1 | * | 10/2002 | O'Donnell | 62/60 |
| 6,641,192 B2 | * | 11/2003 | Eschenfelder | 296/37.1 |
| 2006/0071044 A1 | * | 4/2006 | Stanfield | B60R 9/00 224/274 |
| 2007/0152463 A1 | * | 7/2007 | Hardy et al. | 296/37.1 |
| 2014/0217139 A1 | * | 8/2014 | Bonenberger | 224/274 |

* cited by examiner

*Primary Examiner* — Corey Skurdal
(74) *Attorney, Agent, or Firm* — Jeffrey Roddy

(57) ABSTRACT

A golf cart mounted equipment and accessories holder and method of installation to a golf cart which is non-destructively mounted permanently or semi-permanently to a cart, resides at least partially in the golf cart bag well between the rear wheel wells of the cart, and provides a bag retention strap extending into sections of the bag well not otherwise occupied by the equipment and accessories holder. The equipment and accessories holder possesses at least one elongate pocket and compartments adapted to retain and store balls and accessories.

6 Claims, 5 Drawing Sheets

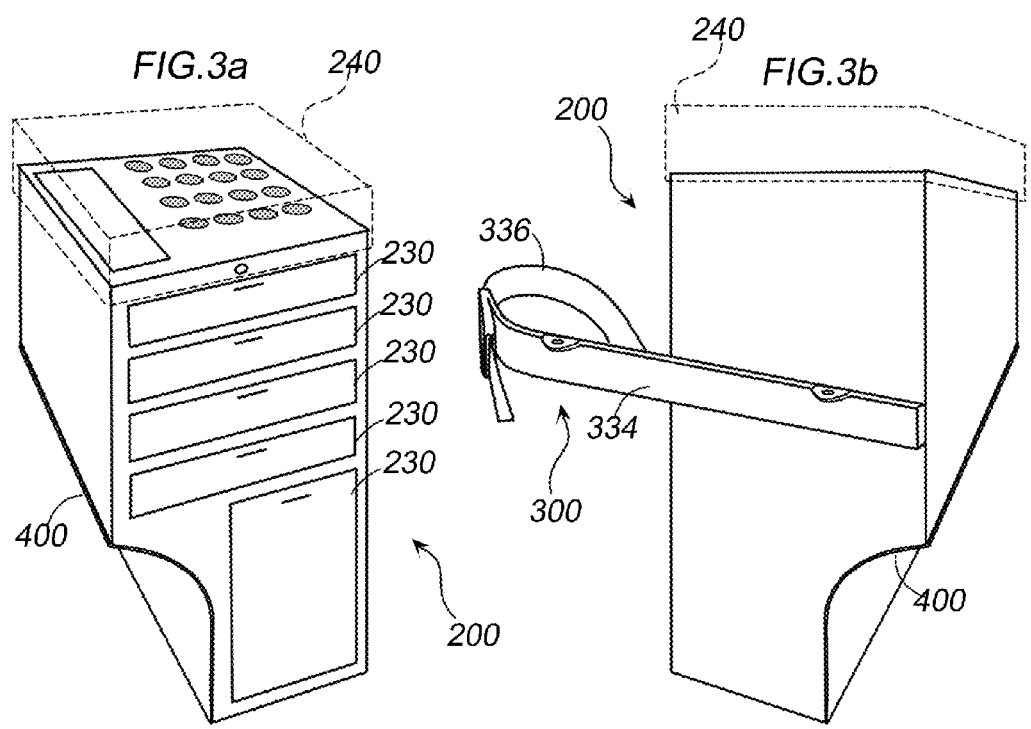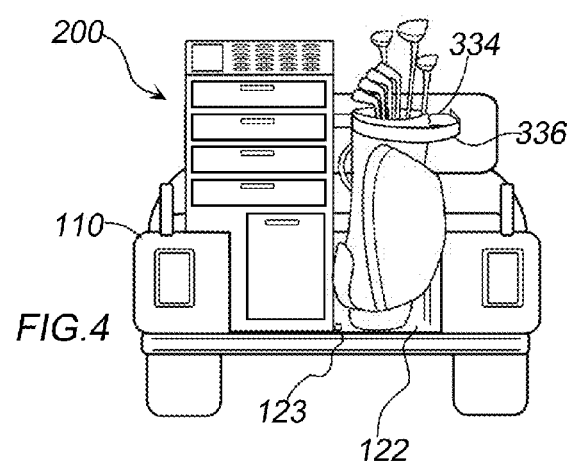

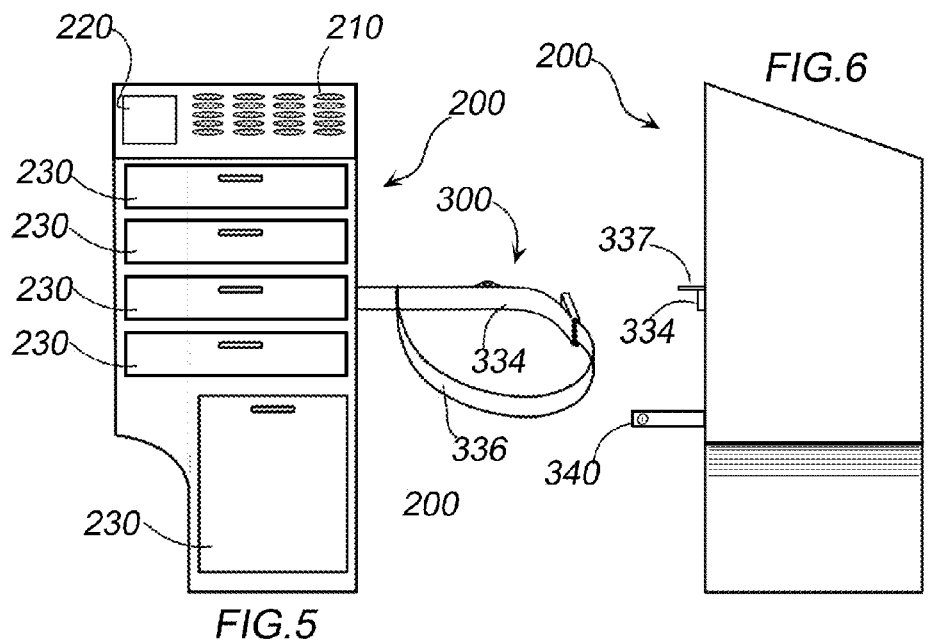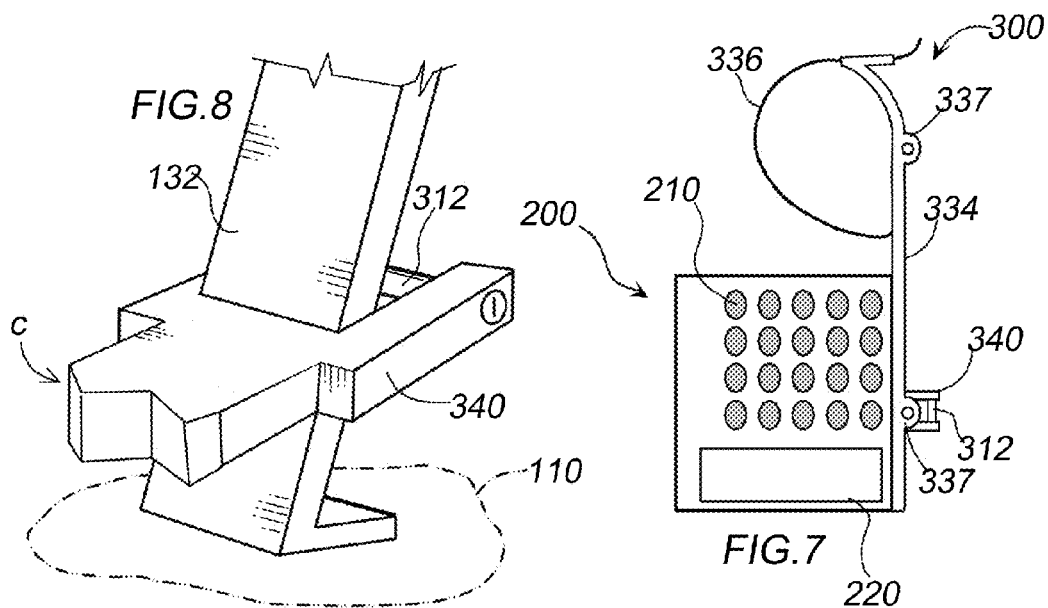

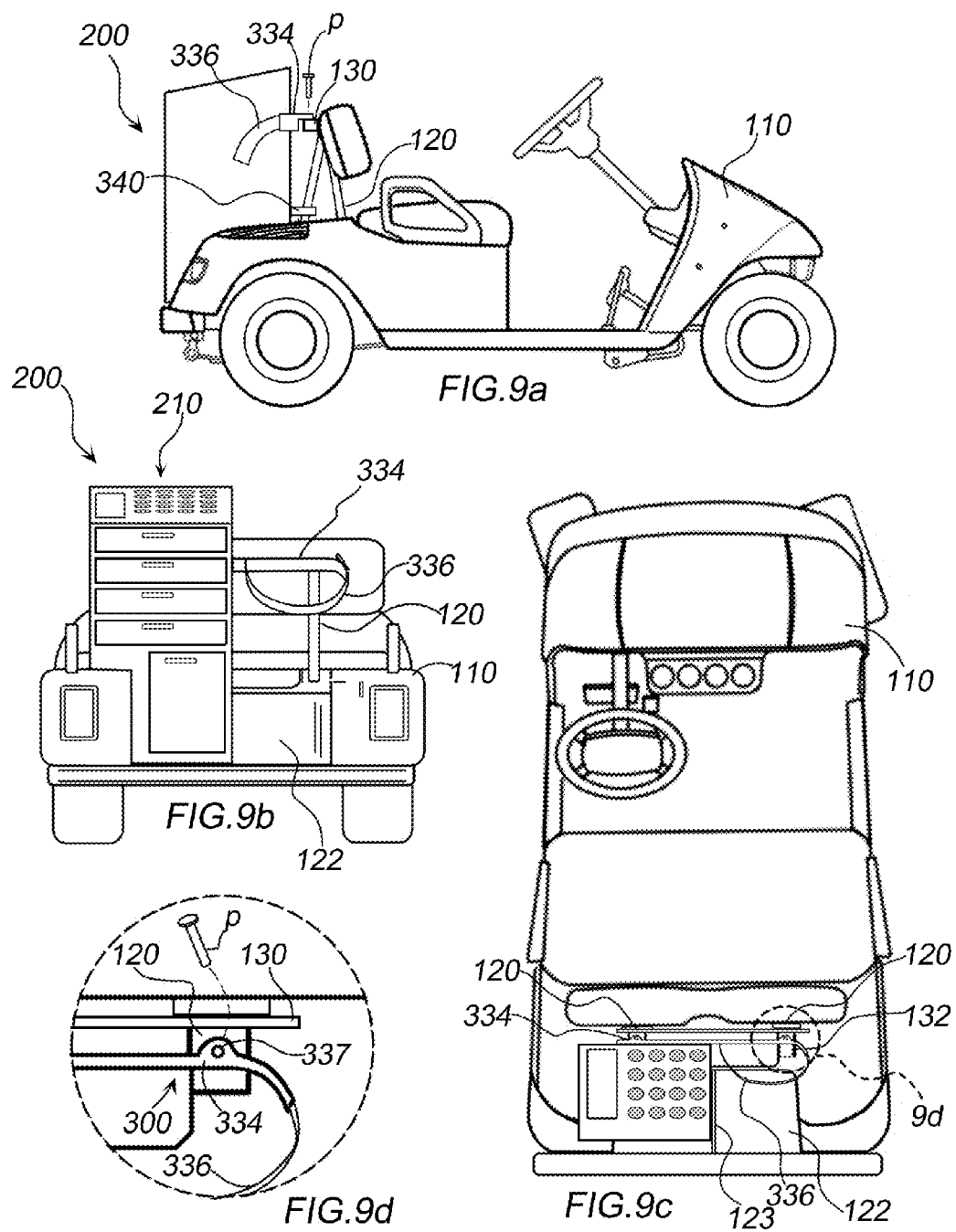

EQUIPMENT AND ACCESSORIES HOLDER

FIELD OF THE INVENTION

The present invention relates generally to an apparatus for holding golf game articles such as clubs, balls and other items, and a method of installation for the apparatus to a golf cart.

BACKGROUND OF THE INVENTION

Personal golf carts come in various configurations, but generally possess a recess, sometimes termed a "bag well," between rear wheel fender wells that provides a platform for the transport of golf bags and other items. In a two seat cart, the recess is unobstructed. Bag racks or bag holders made to secure transported golf bags are often attached to such carts by bolting the rack frame to the seat support frame. In a cart with rear facing seats, jump seats are typically mounted just above the recess, and capacity of the recess is restricted accordingly. While there are a variety of manufacturers of golf carts including E-Z-GO, Club Car, and Yamaha, golf cart seating and bag rack construction is relatively uniform and shares substantial features in common. The floor of the recess typically includes a raised transverse ridge that divides the recess into two sections in order to keep golf bags from sliding against one another.

So called "cart bags" are golf bags designed to be reversibly secured to a golf cart bag rack; typically by cinchable straps that form a loop placed over and around the top end of the golf bag. Smaller golf bags such as "carry bags," can also be secured to the bag rack. While bag racks work well for their intended use; i.e., to secure golf bags for transport, in cases of golfers who live adjacent courses, and who drive a personal cart from their home to the course, mounting and removal of the golf bag to and from the cart is a time consuming and cumbersome process. Another problem facing golfers using bag racks, is potential theft of the golf bag and contents which may be quickly removed from the bag well by loosening the bag retention straps.

U.S. Pat. No. 5,213,364 to Theckston discloses a golf club holder and dispenser as a permanent fixture requiring extensive modification of a golf cart that mounts to the rear of the golf cart body. U.S. Pat. No. 7,481,311 to Old discloses a golf bag similar to a staff-type golf bag that is attached to the golf cart. Although the foregoing references are suitable for their intended use, problems persist. It would be desirable to provide a non-destructive semi-permanent installation for a golf equipment and accessories holder adapted to conform closely to the recess between the rear wheel wells common to most golf carts, and, wherein the equipment and accessories holder is universally attachable to most makes and models of two seat golf carts.

It would be further desirable if such an equipment and accessories holder were weather proof and provided weather protection for its contents.

SUMMARY OF THE INVENTION

The present invention relates to a golf equipment and accessories holder with a compartmentalized body for non-destructive mounting to a golf cart, and which provides for permanent or semi-permanent installation of the compartmentalized body to at least the driver's side of a golf cart bag well. An attachment member 300 for attaching the equipment and accessories holder to portions of a golf cart frame includes a support member with a bag retention strap that extends to portions of the bag well not otherwise occupied by the body of the equipment and accessories holder.

Although some minor variations exist, typically, modern golf carts provide universal attachment points for aftermarket bag racks which are fastened to the frame of the cart by a drop-in pin or bolt that couples a flange or bracket of the bag rack to a corresponding flange or bracket formed on the seat cross bar 130, or on the seat uprights 120.

In one aspect of the present invention, an equipment and accessories holder adapted to contain at least golf clubs, balls and other accessories conforms to the bag well of a cart, and replaces a pre-installed OEM golf bag rack, including the OEM bag strap 136 and OEM bag strap support 134 with a unit attachment member including integrated bag strap support 334 and bag strap 336 that permit the equipment holder to non-destructively attach to the golf cart frame.

In a second aspect of the present invention, a method of installing an equipment and accessories holder to a golf cart permits in a first case, the use of at least a driver's side equipment and accessories holder with a passenger side bag strap, and in a second case, permits installation of both a driver's side and passenger's side equipment and accessories holder to entirely replace a pre-installed bag rack and strap.

In yet another aspect of the present invention, portions of an equipment and accessories holder adapted to contain at least golf clubs, balls and other accessories reside both within the recess and atop one or more rear fender wells.

In the foregoing aspects, subject to security features such as lockable fasteners securing the equipment and accessories holder to portions of the cart, the container unit is readily attachable or detachable from the golf cart.

It will be appreciated by those of ordinary skill in the art that the overall size; e.g., width depth, height and golf cart body conforming contour of the apparatus of the present invention can vary depending on relatively minor size and shape constraints imposed by the various golf cart models.

The foregoing and other objects, features, and advantages of the invention will become more apparent from the following detailed description, which proceeds with reference to the accompanying figures wherein the scale depicted is approximate.

BRIEF DESCRIPTION OF THE DRAWINGS

FIG. 3a is a front facing perspective view of a first embodiment according to the present invention, which is contoured to rest partially over a driver's side rear wheel fender and partially inside of the bag well, or rear recess 122 of the golf cart;

FIG. 3b is a rear facing perspective view showing a replacement bag holder support 334, replacement bag strap 336, and attachment flanges 337;

FIG. 4 is a rear facing view of the embodiment of (FIG. 3a) when installed on a golf cart behind the driver's seat;

FIG. 5 is a front facing elevation of the embodiment depicted in (FIG. 3a);

FIG. 6 is a side view of the embodiment depicted in (FIG. 3a);

FIG. 7 is a top down view of the embodiment depicted in (FIG. 3a);

FIG. 8 is partial perspective view of a section of seat frame 132 engaged with a lockable yoke 340;

FIG. 9a is a side view of the embodiment shown in (FIG. 3a) when installed on a golf cart;

FIG. 9b rear facing view of the embodiment of (FIG. 9a) installed on one side of recess 122 of a golf cart;

FIG. 9c is a top down view of the embodiment of (FIG. 9a) installed on one side of recess 122 of a golf cart;

FIG. 9d is a detail view taken from (FIG. 9c), that depicts on exemplary attachment of the replacement bag support portion 334 of the equipment carrier 200 to the frame of a golf cart;

DETAILED DESCRIPTION OF THE INVENTION

Figure 1:
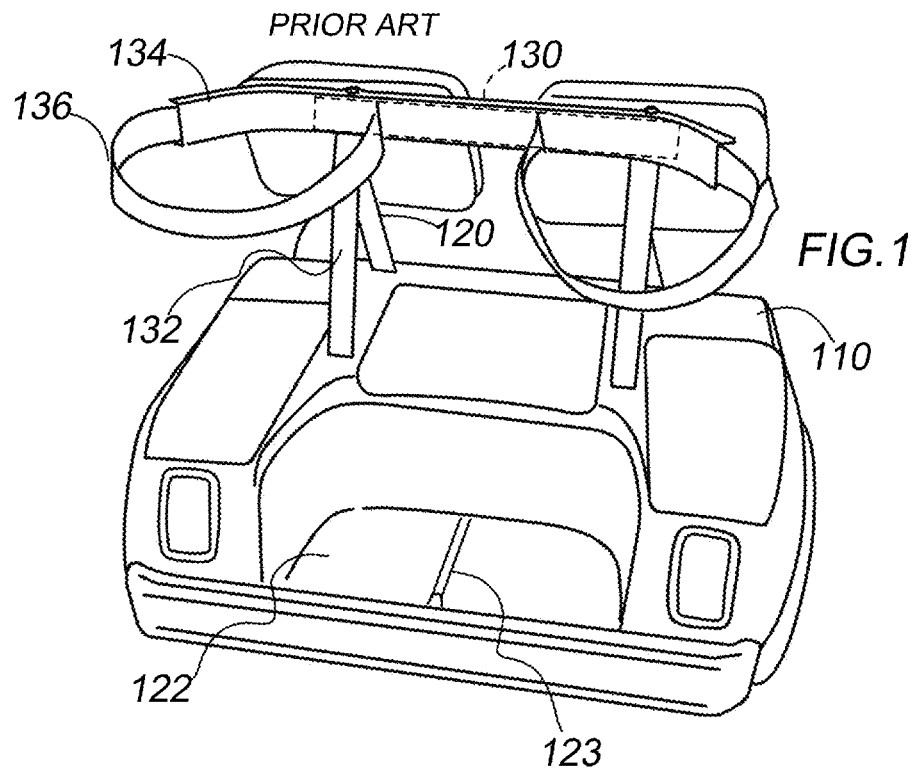
FIG. 1 is a rear perspective view of a golf cart with an installed typical prior art OEM bag rack with strap support 134 with strap 136 connected to the seat frame crossbar 130.

Reference Listing of Elements 100 cart frame
110 cart body
120 seat frame
122 rear recess
123 ridge
130 seat crossbar
134 OEM bag holder support
136 OEM bag holder strap
200 equipment unit
210 club slot
220 pocket
230 drawer
240 cover
300 unit attachment member
334 support member
336 bag holder strap
337 frame attachment flange
340 yoke
400 weather-shield

DEFINITIONS

In the following description, the term Original Equipment Manufacturer or "OEM" refers to equipment and add-ons provided by the golf cart manufacturer as an accessory that may be pre-installed and that retains the golf cart warranty, as opposed to aftermarket add-ons involving modifications to the cart body or cart frame that potentially void the warranty. The term "compartments" refers to pockets, slots, drawers, pouches and/or recesses that are adapted to store golf equipment or accessories. The term "non-destructive" means that installation does not involve drilling or welding portions of the body or frame of the golf cart, attaching an accessory to the cart in a manner where it cannot be easily removed, or altering the cart in a way that would typically void a manufacturer's warranty. Unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting.

Referring generally to FIGS. 1-10c, a golf equipment and accessories holder 200 for semi-permanent installation and non-destructive mounting to a golf cart. A portion of the equipment and accessories holder is shaped and sized to conform closely to the rear recess or bag well 122, of a golf cart between the rear wheel wells. The equipment and accessories holder includes an attachment member 300 with support 334 and attachment flanges 337 for mounting to a golf cart frame and which provides a passenger side retention strap 336 to retain a passenger side golf bag in portions of the bag well not otherwise occupied by the equipment and accessories holder. The equipment and accessories holder includes elongated pockets 210 adapted for stowing shafts of golf clubs, and pockets 230, slots or pouches 220 that are adapted to store game equipment and other small articles. While preferably, the equipment and accessories holder is mounted to the cart frame by aligning the apertures of flanges 337 with a corresponding flange and aperture of the cart frame whereby a pin (p) (see FIGS. 9a and 9d), such as a clevis bolt and cotter pin may be used to secure the equipment holder securely to the frame, other securing means may be used such as a yoke 340 that projects from a side of the equipment and accessories holder that is clamped or otherwise secured to the OEM back cushion support post(s), or another portion of the cart frame. A swivelable connection (not shown) may connect yoke 340 to a side of the equipment and accessories holder that normally faces the rear of the cart seats.

As depicted in FIG. 4, and FIGS. 9a, 9b, 9c and 9d, in some embodiments, an equipment and accessories holder 200 is mounted on a driver's side of recess 120 and includes a support member 334 and strap 336 that provide bag retention capabilities for a passenger or guest.

As best shown in FIGS. 3a and 3b, the equipment and accessories holder preferably possesses a weather-shield 400 around edges which abut surfaces of the golf cart when the equipment and accessories holder is installed thereon. The weather-shield may be an elastomeric or foam strip that compresses and conforms to surface irregularities inside or adjacent to recess 122, in order to prevent water seepage between the equipment and accessories holder body and surfaces of the golf cart. In some embodiments, an equipment and accessories holder has a cover 240 that may be removable.

Figure 2:
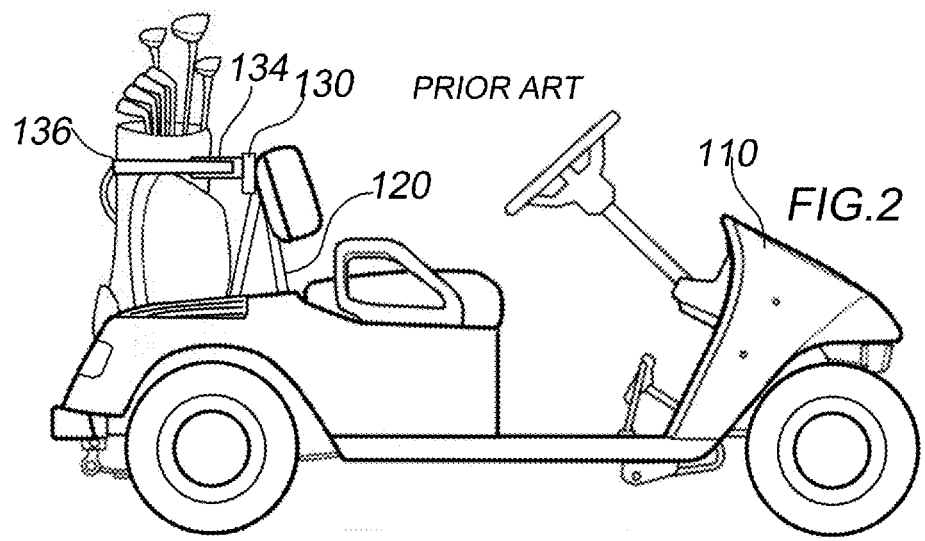
FIG. 2 is a side elevation of a typical prior art implementation with a golf bag retained by a golf bag rack with strap.

FIGS. 1 and 2 depict prior art elements essential to understanding installation methods for securing the equipment and accessories holder of the invention to a golf cart, and which include in one embodiment, a bag rack having a support member 334 that is attachable to a cart frame (120, 130), and a bag strap 336 that is designed to retain a golf bag in an upright position in that portion in the bag well of a cart.

FIG. 3a is front perspective view of one embodiment of an equipment and accessories holder having compartments (210, 220 and 230) for the retention and organization of clubs and other game related articles. FIG. 3b is a rear perspective view depicting a bag rack support that attaches the equipment and accessories holder to the cart frame and also replaces a pre-installed bag rack.

FIG. 4 shows the equipment and accessories holder shown in (FIG. 3a) mounted within the driver's side bag well of a golf cart.

Moving to to FIGS. 5-8, an attachment member for securing the equipment and accessories holder 200 to portions of a golf cart preferably includes a support member 334 and a drop-in clevis bolt, or other fastening member as will be appreciated by those having skill in the art and access to this disclosure. Other suitable securing members may include clamp(s) or a yoke or yoke(s) 340 extending from a side of the equipment and accessories holder. FIG. 8, in one exemplary installation, shows a locking yoke 340 with a removable pin 312 surrounding a section of seat frame.

FIGS. 9a-9c show respectively, a side view, rear facing view and top down view of an equipment and accessories holder 200 installed within the driver's side bag well of a cart.

Figure 10A:
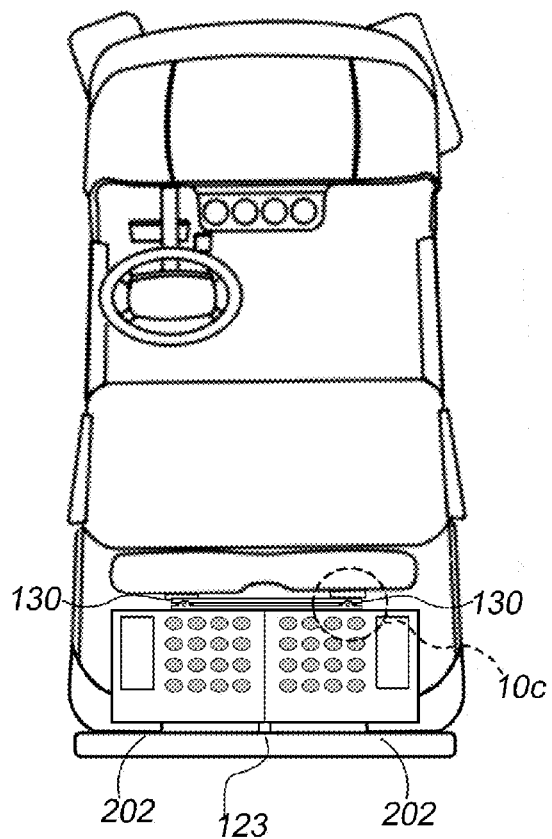
FIG. 10a is a top down view of the embodiment of (FIG. 9a) installed on one both sides of recess 122 of a golf cart.
Figure 10B:
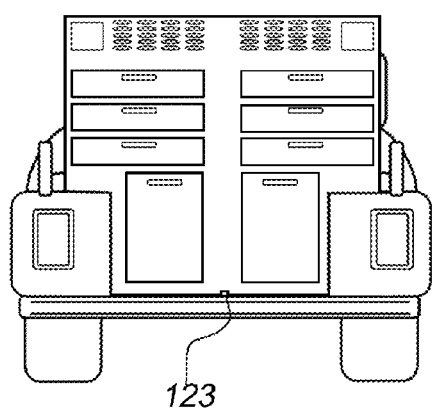
FIG. 10b rear facing view of an embodiment installed on both sides of recess 122 of a golf cart.
Figure 10C:
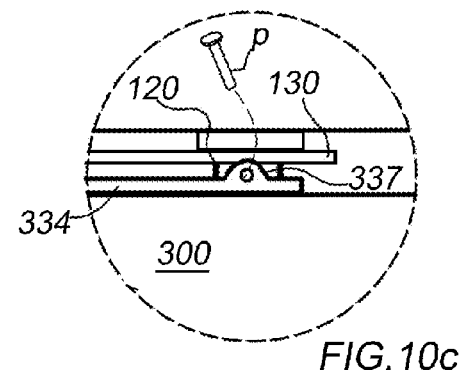
FIG. 10c is a detail view taken from (FIG. 10b) that depicts an exemplary attachment of the equipment and accessories holder to the cart frame.

FIGS. 10a and 10b depict respectively a top down view, and a rear facing view of a pair of equipment and accessories holders installed side by side within the driver's side and passenger's side sections of the bag well. Note the slight separation between the separate units due to ridge 123 (FIG. 1), which is a typical feature of a golf cart bag well.

The compartmental configuration of the equipment and accessories holder depicted in the figures is merely exemplary. The particular arrangement, length, depth, width and overall configuration of compartments including apertures, slots, pockets, drawers and pouches may vary without departing from the disclosed invention. Compartment panels may pull outwardly like a drawer panel, or pivot or hinge outwardly. Compartment recesses may be any shape according to the intended contents, and may be sub-divided. Although in the embodiments depicted, a plurality of club slots 210 are shown, the equipment and accessories holder may include one or more relatively larger slots adapted to hold a plurality of clubs. The slots may be an array of apertures; e.g., a grid or screen, that opens to one or more cavities, or a single relatively large aperture. One or more locks may be provided to secure one or more compartments of the equipment and accessories holder to prevent theft. Compartment locks, if any are included, are not limited to any one lock type and plural locks may be incorporated into the body of the equipment and accessories holder or added by a user; e.g., padlocks. Cover, 240 may be of soft or hard shell construction and may be removable. It is conceivable that the cover simply be a soft flap that is attached; e.g, sewn, to the equipment holder, or is attached thereto by snaps, zippers or other attachment means that will be appreciated by those having skill in the art. The particular shape of the cover as depicted is merely exemplary. A lock may be provided with which to secure the cover in place.

In addition, the body of the equipment and accessories holder may be resilient, but able to maintain an upright appearance without bending, creasing or slumping. Sides of the body may be rigid or semi-rigid and constructed of plastic, wood, metal, composite or any combination of the foregoing. The shell of the body may be fabric or vinyl with a rigid inner framework. While the particular embodiments depicted herein show an equipment and accessories holder installed either singly, or as a pair (FIG. 10a), it is intended that a pair of equipment and accessories holders may form a unitary; i.e., inseparable construction (FIG. 10b). In cases where the equipment and accessories holder is one piece and spans the entire bag well, a trough may be formed on the bottom of the equipment holder to accommodate ridge 123. To mount a one piece equipment and accessories holder to the cart frame, the strap portion 336 of the attachment member 300 is removed (FIG. 10d), while the support 334 and flanges 337 remain and are affixed in the same manner as described for the single driver's side embodiment.

It should be understood that the drawings and detailed description herein are to be regarded in an illustrative rather than a restrictive manner, and are not intended to be limiting to the particular forms and examples disclosed. Accordingly, it is intended that this disclosure encompass any further modifications, changes, rearrangements, substitutions, alternatives, design choices, and embodiments as would be appreciated by those of ordinary skill in the art having benefit of this disclosure, and falling within the spirit and scope of the following claims.

What is claimed is:

1. An equipment holding system for a golf cart comprising:
    (1) an equipment and accessories holder with a compartmentalized body with a lower portion configured to nest within a bag well of a golf cart, and possessing compartments for game equipment and accessories, at least one elongate cavity in the compartmentalized body, and the body having an outer contour conforming closely to the bag well of the golf cart,
    (2) an attachment member extending from the compartmentalized body configured for non-destructive coupling to pre-existing OEM seat frame portions of the golf cart whereby the compartmentalized body is secured thereto, and a bag strap connectable to the attachment member that extends into portions of the bag well not otherwise occupied by the compartmentalized body.

2. The equipment holding system according to claim 1 further comprising curving portions shaped to rest atop rear fender wells of the golf cart.

3. The equipment holding system according to claim 1 further comprising a weather-shield to prevent moisture from accumulating between the cart cart body and the compartmentalized body.

4. The equipment holding system according to claim 1 further comprising at least one locking member for securing contents.

5. A method for installation for an equipment and accessories holder to a golf cart comprising the steps:
    (1) providing at least one equipment and accessories holder for non-destructive attachment to a golf cart, adapted to closely conform to contours of a bag well of the golf cart, and over at least one wheel well, and, wherein the equipment and accessories holder includes a body with a lower portion configured to nest within the bag well of the golf cart, with compartments for game equipment and accessories and an adjustable frame attachment member having a removable bag strap portion that extends into portions of the bag well not otherwise occupied by the compartmentalized body;
    (2) removing any prior installed bag rack and bag straps;
    (3) fitting outer surfaces of the equipment and accessories holder to surfaces of the golf cart bag well and aligning a bottom edge of the equipment and accessories holder to one or both bottom sides of the bag well of the golf cart; and,
    (4) non-destructively securing the body of the equipment and accessories holder to pre-existing OEM frame portions of the golf cart by reversibly coupling portions of the attachment member to the pre-existing OEM frame portions of the golf cart.

6. The method according to claim 5 wherein the bag strap portion of the attachment member is removed when the at least one equipment and accessories holder spans the entire bag well.

* * * * *